Sept. 24, 1968

A. J. GRINER 3,402,803

ARTICLE CONVEYING, COLLECTING AND METERING METHOD AND APPARATUS

Original Filed Dec. 31, 1963

INVENTOR.
ARTHUR J. GRINER
BY Bauer & Seymour
ATTORNEYS

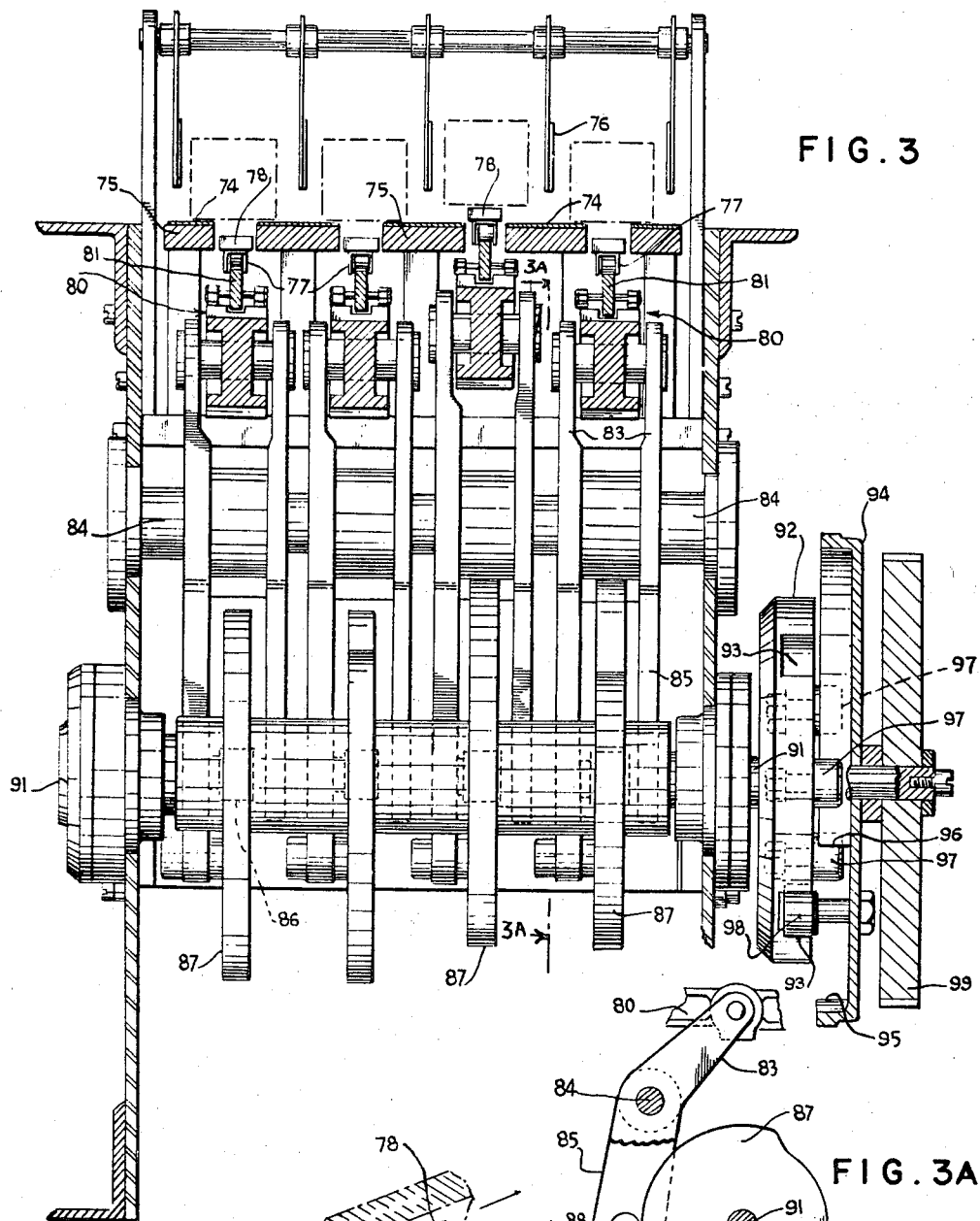

Sept. 24, 1968  A. J. GRINER  3,402,803
ARTICLE CONVEYING, COLLECTING AND METERING METHOD AND APPARATUS
Original Filed Dec. 31, 1963  6 Sheets-Sheet 3
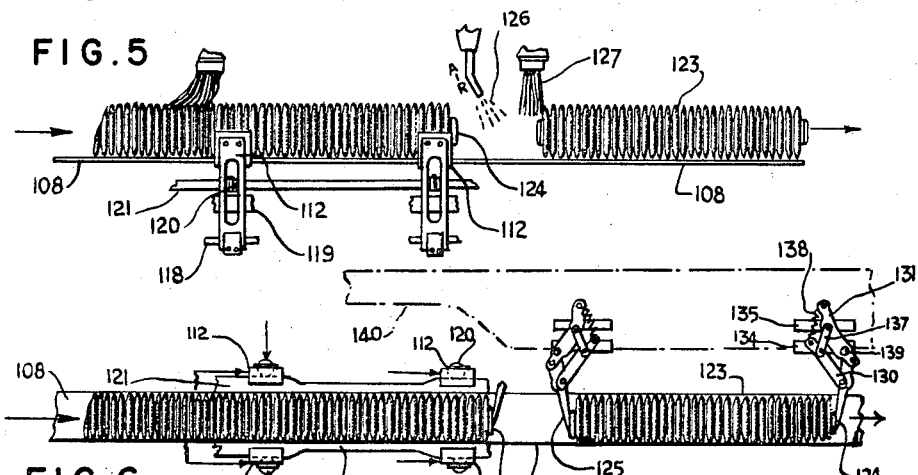
FIG. 5
FIG. 6
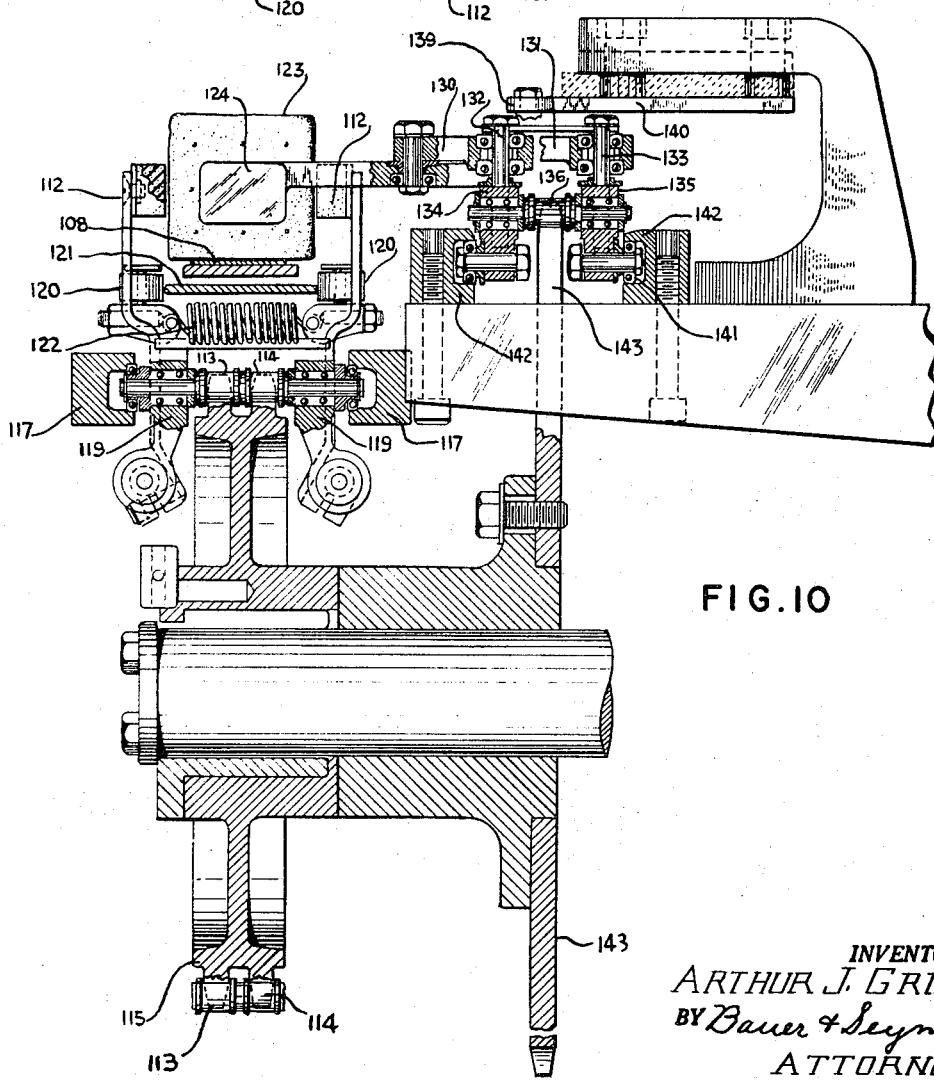
FIG. 10
INVENTOR.
ARTHUR J. GRINER
BY Bauer & Seymour
ATTORNEYS

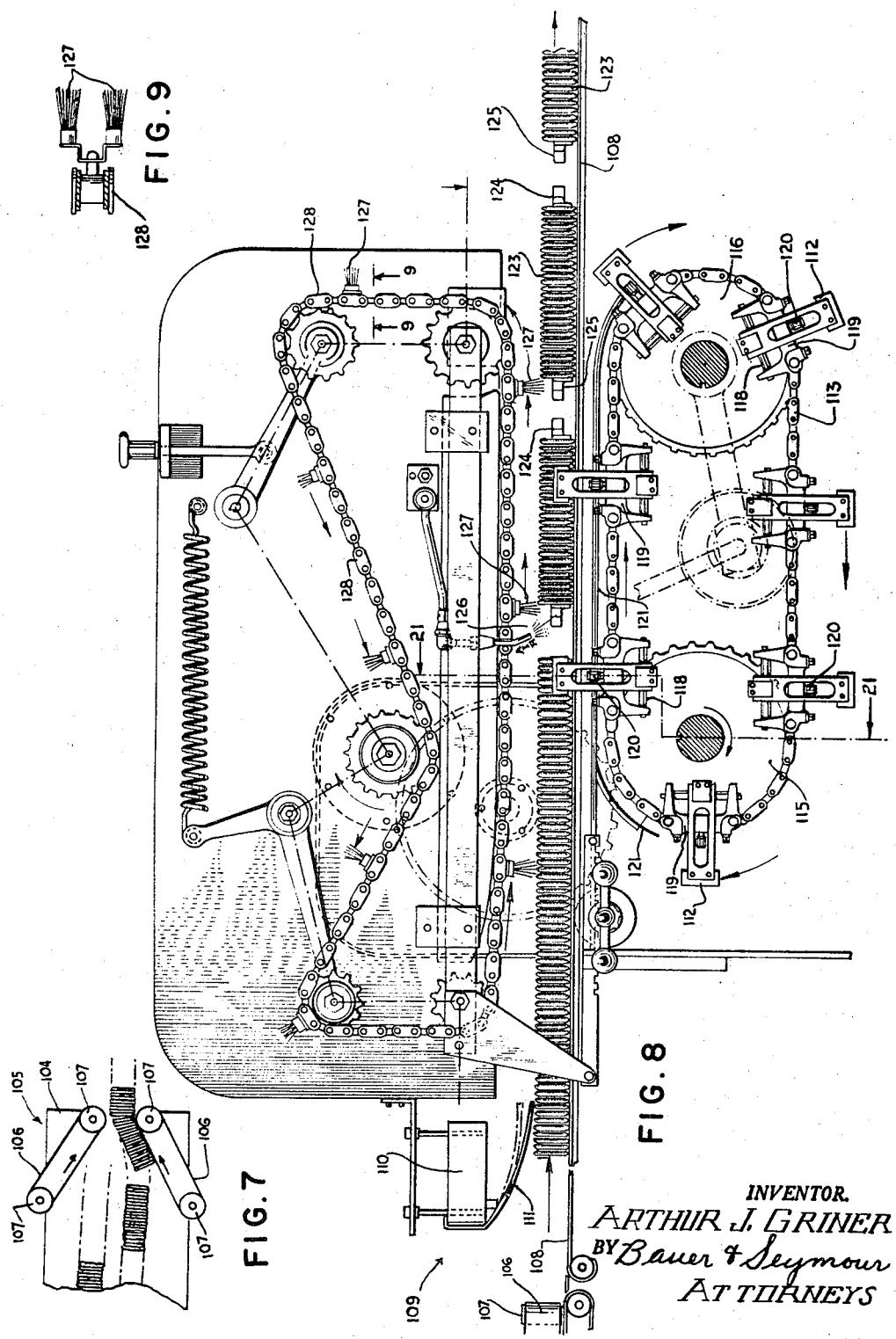

Sept. 24, 1968   A. J. GRINER   3,402,803
ARTICLE CONVEYING, COLLECTING AND METERING METHOD AND APPARATUS
Original Filed Dec. 31, 1963   6 Sheets-Sheet 6

INVENTOR.
ARTHUR J. GRINER
BY Bauer & Seymour
ATTORNEYS

United States Patent Office 3,402,803
Patented Sept. 24, 1968

3,402,803
ARTICLE CONVEYING, COLLECTING AND
METERING METHOD AND APPARATUS
Arthur J. Griner, Wyckoff, N.J., assignor to National
Biscuit Company, New York, N.Y., a corporation of
New Jersey
Continuation-in-part of applications Ser. No. 310,532,
Sept. 19, 1952, and Ser. No. 169,164, Jan. 5, 1962.
Division of application Ser. No. 334,796, Dec. 31,
1963. This application Dec. 21, 1966, Ser. No.
603,486
23 Claims. (Cl. 198—32)

ABSTRACT OF THE DISCLOSURE

Apparatus for continuously advancing parallel rows of flat articles, such as biscuit stacked on edge while sequentially segregating and advancing measured groups of articles from said rows in staggered relation, directing the staggered groups into a single continuously advancing column, and dividing the column into spaced-part metered packageable units of said articles.

---

This application is a division of my pending application Ser. No. 334,796, filed Dec. 31, 1963, for "Method and Apparatus for Handling Tablet-Like Articles Such as Biscuits," and a continuation-in-part of my applications Ser. Nos. 310,532, now Pat. No. 3,248,808, and 169,164, filed Sept. 19, 1952, and Jan. 5, 1962, respectively, for "Packaging Method and Means," said Ser. No. 310,532 being now abandoned in favor of continuation application Ser. No. 559,242, filed June 21, 1966, for "Method of Packing Articles."

The present invention relates to the automatic handling of relatively flat articles, such as biscuit in the form of crackers, cookies and the like and more particularly to apparatus and methods for continuously conveying multiple rows of such articles stacked on edge, collecting and converging the same into a single column, and metering the same for automatic packaging.

A main purpose of the invention is to provide means and methods for automatically advancing and handling baked goods and comparable products between a continuously producing bake oven or other production apparatus and packaging machinery, leaving only occasional adjustments to be made by attendants in charge of the equipment.

The apparatus of the present invention comprises means in novel combination for continuously conveying articles stacked on edge, automatically combining plural rows or columns of such articles into a single row, metering the articles of a single row and segregating metered lengths or groups thereof for wrapping, which may be accomplished by automatic wrapping machinery of known construction.

By way of example, the invention is particularly suited to and is illustrated and described here in connection with the handling of crackers or biscuit baked in a continuous line oven wherein the biscuits are baked and emerge on a continuous moving belt conveyor in the form of large sheets which are longitudinally and transversely scored to divide the same into biscuit-size areas, as described in my aforesaid parent application. The scored sheets issuing from the oven are first broken along the transverse scores to form transverse strips of unseparated biscuit which are shingled or stacked on edge and conveyed through a conditioning zone.

As further specifically disclosed in said parent application, the shingled or stacked strips are continuously conveyed broadside and broken along the longitudinal scores into unit size biscuits or panels, thus forming substantially contacting side-by-side rows or columns of stacked panels. The contacting adjacent rows are then caused to diverge or fan out laterally so that the distance between adjacent rows is progressively increased. A plurality of such rows of biscuit panels are continuously advanced by a continuously moving belt conveyor and are next consolidated by novel apparatus into a single row without interrupting the advancing movement of the biscuit. The resulting single line or row is automatically divided into metered, segregated sections or packageable units which may be fed into a machine of known construction for automatic packaging.

It is, then, an object of the invention to provide novel means for continuously advancing parallel rows of articles and for periodically picking off the foremost or leading groups of articles from said rows in rotation and advancing the same at a high speed, whereby the articles are advanced in groups which are staggered transversely of the direction of advance to permit convergence thereof into a single row.

Another object of the invention is to provide novel apparatus for segregating a continuously advancing single row or column of biscuit or the like stacked on edge into metered groups or units for packaging.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a plan view, with parts removed and partly diagrammatic, showing a so-called overrun or uplift conveyor mechanism for dividing advancing rows of articles into staggered groups or sections;

FIG. 3 is a transverse elevation view on an enlarged scale and partly in section, taken substantially on line 3—3 of FIG. 2;

FIG. 3A is a detail view taken on line 3A—3A of FIG. 3;

FIG. 4 is a detail isometric view illustrating a part of an uplift chain conveyor of the mechanism of FIG. 1;

FIGS. 5 and 6 are side elevation and plan views, respectively, of a portion of a single moving column or row of articles stacked on edge illustrating how the same are metered and segregated into packageable units;

FIG. 7 is a detail diagrammatic view illustrating means for converging staggered sections of parallel rows of articles into a common row or column;

FIG. 8 is a side elevation view illustrating a mechanism for metering and segregating a single row of articles into packageable units;

FIG. 9 is a detail view taken on line 9—9 of FIG. 8;

FIG. 10 is a sectional view with parts removed, the section being taken substantially on line 21—21 of FIG. 8;

Figure 1:
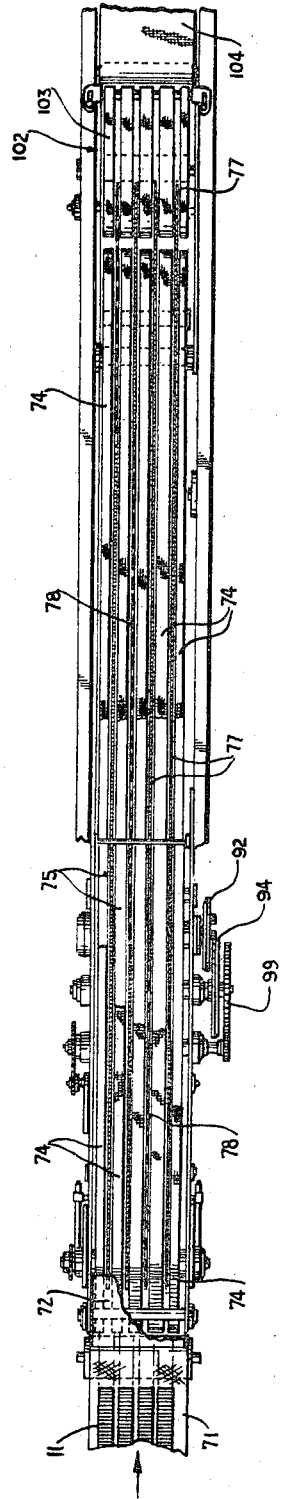

In the illustrated embodiment, by way of example, four spaced parallel rows of crackers on edge are directed by side guides positioned between the rows and advanced by a single wide conveyor belt 71 and thence across a stationary plate 72 under a series of overhead rotating disclike brushes 73. The latter engage the top edges of the crackers in each row and are driven at a peripheral speed greater than that of belt 71 so that the crackers in each row will be titlted forwardly in the direction of advancement. This is desirable to facilitate the handling thereof in the uplift conveyor to which the crackers are delivered from plate 72.

The rows of crackers thus tilted forwardly move onto the conveyor belts 74 of the uplift conveyor unit, which belts are driven at the same speed as belt 71. For the four rows of crackers, the uplift conveyor on the form illustrated has five transversely spaced endless tapes or belts 74, the upper runs of which ride on suitable supports 75, as shown in FIG. 3 wherein the crackers are illustrated in phantom. The spacing between adjacent edges of adjacent belts 74 is less than the width of the crackers so that each row transversely bridges the space and rides on the edge portions of the two belts. Suspended longitudinal guides 76 are provided between the rows of crackers. In the interest of clarity, the lower reaches of belts 74 are illustrated by a dotted line in FIG. 2.

Figure 2:
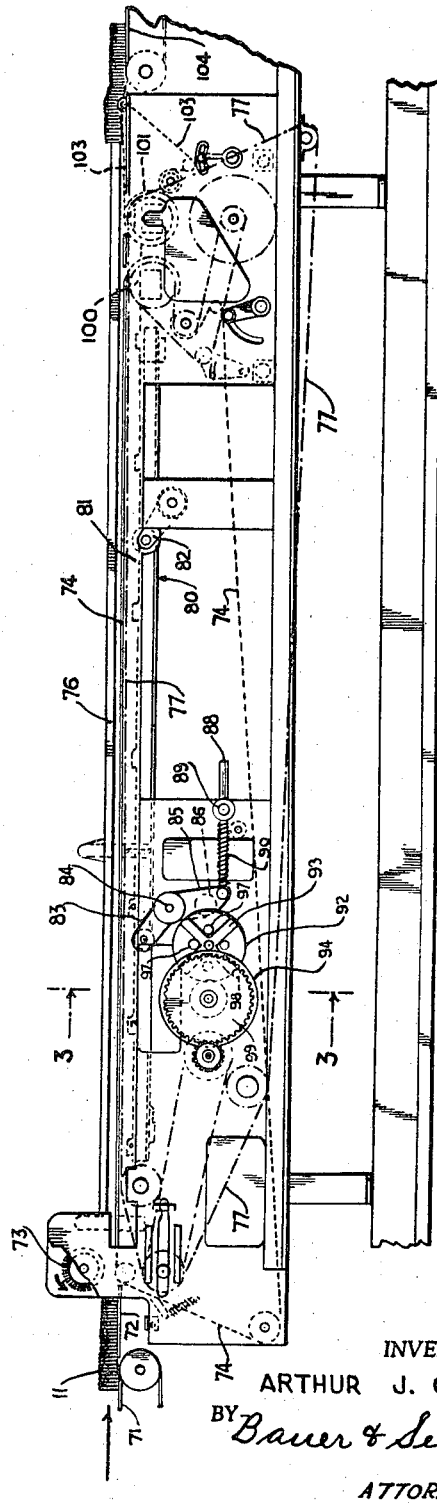
FIG. 2 is a side elevation view of the mechanism of FIG. 1.

Mounted for normal operation below and in line with the space between each pair of belts 74 is an endless chain conveyor 77 which is driven at a speed equal to the speed of belts 74 multiplied by the number of rows of crackers handled by the uplift unit, this being four in the illustrated embodiment. The lower reaches of chains 77 are illustrated in FIG. 2 by a dot and dash line in the interest of clarity and simplicity. Each chain conveyor 77 thus operates normally below a row of crackers without affecting the normal movement thereof by belts 74, but the upper reach of each chain is mounted to be periodically lifted or raised to engage a leading section of crackers in the row above it and to advance the same at an accelerated speed. For this purpose, predetermined lengths of each chain 77 are provided with blocks 78 (FIG. 4) which engage the lower edges of the crackers when the chain is lifted, and thus lift a leading section of crackers off the belts 74. An auxiliary support in the form of a bracket 79 is mounted at the trailing end of each set of blocks 78 to prevent rearward tilting or sliding of the crackers in the lifted and accelerated section or group.

Means are provided for lifting the upper runs of chain conveyors 77 in rotation and in timed relation to each other and to the advancement of the rows of crackers by belts 74. In the form illustrated, said means comprises a rail 80 for each chain to support the upper run thereof. Each rail is shown as being fabricated from an I beam and an edgewise plate 81 on which the chain rides (FIGS. 3 and 4). Each of the rails 80 is supported by a pivoted arm 82 and an equal parallel arm 83 of a bifurcated bell crank lever pivoted on a cross shaft 84. The other or lower arm 85 of the bell crank lever extends downwardly and is provided with a cam follower roller 86 for engagement with the periphery of a series of cams 87 (FIG. 3) mounted on a transverse shaft which is intermittently driven in a manner hereinafter described by a Geneva gear mechanism. Arm 85 of each bell crank is also pivotally connected to a rod 88 slidably guided by a stationary support 89. Resilient means are provided for urging lever 83, 85 in a clockwise direction as viewed in FIG. 2 in opposition to the action of the respective cam 87. As shown, such resilient means is in the form of a compression coil spring 90 surrounding rod 88 between lever arm 85 and support 89. Thus, when a roller 86 rides into a depression in the surface of its respective cam 87, spring 90 is effective to pivot the bell crank clockwise and thereby lift the rail 80 to which it is pivotally attached. The rail is maintained in a horizontal position at all times by the parallel equal arms 82 and 83. When the cam follower 86 rides up on the lobe of the cam surface, lever 83, 85 is pivoted counterclockwise (FIG. 2) to again lower the rail 80 and the chain riding thereon and to compress spring 90 for the next operation. The surfaces of cams 87 are designed to effect the intermittent lifting of the four rails 80 successively and repeatedly in timed relation to thereby effect accelerated movement of the leading sections of the four rows of crackers in predetermined succession, whereby the accelerated sections will be staggered transversely in the direction of advance. The location and spacing of the sections of blocks 78, which are the only parts of the chain conveyors which project above belts 74 and have engagement with the crackers when the chains are lifted, is such that the trailing end of each section of accelerated crackers will be in approximately the same transverse plane or line as the leading edge of the succeeding accelerated section.

On the same transverse shaft 91 with cams 87 is a Geneva gear member 92 having perpendicular diametrical grooves 93. Mounted to cooperate with and to intermittently rotate member 92 is a flanged or rimmed member 94 having a flange or rim which is cut away between the points 95 and 96 to successively receive each of four axially extending rollers 97 on member 92. The projecting rollers are so placed that when one is riding the inner surface of member 94, two such rollers ride the outside periphery of said member to better solidify the cooperating parts. Member 94 carries an axially projecting roller 98 that enters and slides in one of grooves 93 to effect rotation of member 92, and hence, cams 87 in a manner well understood in the art, through an angle of 90° during each revolution of member 94. The latter may be driven by a gear 99. Thus, during a portion of each complete revolution of rimmed member 94, roller 98 engages a groove 93 and rotates the cams 87 through a 90° angle. If the uplift conveyor unit handles more or less than four rows, as in the illustrated embodiment, the construction of the Geneva gear mechanism may be suitably altered in a manner well understood in the art to effect rotation of the cams intermittently through angles equal to 360° divided by the number of rows and hence, the number of cams. Other known means may, if desired, be substituted for the Geneva gear mechanism to effect timed intermittent actuation of the rails 80 and hence, the chain conveyors.

At the discharge or right-hand end of the uplift conveyor unit, as viewed in FIGS. 1 and 2, the upper reaches of belts 74 terminate at pulleys 100, whereas the chain conveyors 77, 78 continue a short distance beyond to sprockets 101 for depositing each accelerated group or section of crackers on a short belt conveyor unit 102 which is similarly constructed and forms a continuation of the belt conveyor portion 74 of the uplift unit. The conveyor belts 103 of unit 102 are, however, driven at a speed equal to the speed of the conveyors 77, 78. The belts 103 thus receive and carry the staggered accelerated groups of crackers away from the uplift unit at the accelerated speed and onto a single wide belt conveyor 104.

In order to bring into a single column the staggered groups of crackers which have been advanced onto conveyor 104, there is provided a converging device 105 (FIG. 7) into which the staggered sections are fed. In the illustrated device, the converging unit consists of two endless belts 106, each belt being trained about a separate pair of vertically mounted pulleys 107 arranged above belt 104 so that the belts 106 are angularly disposed toward one another in a horizontal plane. Each pair of pulleys 107 is comprised of a driving and driven pulley arranged so that the surfaces of the belts 106 face one another and travel continuously toward the narrowest point of convergence. The endless belt 104 is sufficiently wide to extend across the entrance of the converging device and is disposed thereunder to convey the staggered sections from the four rows of crackers as they are fed to the converging device. During this operation, an acclerated section of crackers arriving off center at the entrance to the converging device 105 will be carried forward until its leading end engages one of the angularly disposed belts 106. This section of crackers will then be diverted from its former straight path of travel and caused to follow the angular direction of the endless belt toward the exit of the converging device. When a section or group of crackers reaches the apex formed by the two converging belts 106, a passageway is provided just wide enough for a single column or row of crackers to pass therethrough. In this manner, each section or length of crackers will be joined immediately by its following section to form, in contrast to the previously laterally disposed staggered lengths of crackers, a single, unbroken column or row of crackers stacked edgewise and fed continuously at an even rate of speed by a conveyor 108.

A suitable uplift conveyor-converger unit constructed as described above to receive and consolidate four laterally spaced continuously moving rows of crackers segregates one moving row of crackers at a time into predetermined lengths, say 10 feet, each of the which is lifted vertically a short distance above the plane of adjacent rows of crackers and thus disengaged from conveyor belts 74. As soon as one 10-foot or other selected length or section of each row is elevated, that entire section of stacked crackers is advanced linearly by a chain conveyor 77 at four times the speed at which its adjacent three rows are moving in order to place it ahead of its immediately adjacent row. As soon as such advance is completed, then the immediately adjacent column is similarly elevated and carried forward in the same manner, and so on, successively and repeatedly with crackers from the four columns. The timing is such that groups or sections of crackers which had been moving along side by side on belts 74 in four columns are successively and rotatably moved ahead by conveyors 77 so that the leading end of one advancing section is in substantially transverse alignment with the trailing end of the section which was advanced immediately before it. These staggered, segregated lengths or sections of crackers are then consolidated by the converging unit 105 into a single row or column.

In order to condition the single column or row of crackers for automatic packaging, it may be desirable to level out the top edge thereof. This may be accomplished by a suitable tamping device 109 (FIG. 8) which brings into alignment the upper edges of all the crackers passing thereunder. The tamping device may consist of an electromagnetic vibrator 110 of any suitable commercial design which, when energized, vibrates a metallic reed 111 against the upper edge of the passing column of crackers.

The apparatus above described has been concerned mainly with the combining of a plurality of lines of crackers stacked on edge into a single column or row of crackers stacked on edge for feeding into a wrapping machine. FIGS. 5 and 6 show such a single column of crackers stacked edgewise and supported on conveyor 108 advancing in the direction of the arrows. Inasmuch as the metering and segregating operations to be next described are all coordinated in speed and timed relation, a unit of space-time relationship termed a "cycle" is adopted to facilitate the description. Therefore, in the following description of the metering and segregating operations, the term "cycle" will be understood to indicate that period of operation of the machine required to perform the steps for metering and segregating packageable groups or units of crackers from the column being advanced by conveyor 108.

In FIGS. 5 and 6, there are shown two pair of rubber-faced grippers 112 which, together with a plurality of like pairs of grippers, are carried on endless belts in the form of chains 113 and 114 which in the illustrated embodiment are integrated in the interest of simplicity to operate on dual sprockets 115 and 116 mounted directly below conveyor 108 (FIGS. 8 and 10). The chains may be further supported and guided by rollers mounted thereon to ride in tracks 117 (FIG. 10). All of the rubber-faced grippers 112 may be cam and spring operated for transverse movement relative to the direction of travel of the cracker column.

In the illustrated embodiment, each of the grippers 112 is pivotally mounted on a pivot pin 118 supported by spaced arms projecting from bars 119 pivotally connected at each end to the sides of chain 113, 114. Each gripper carries a cam follower roller 120 that is adapted to engage and follow the edge of a cam plate 121, both edges of which are suitably formed to control the actuation of the pairs of grippers 112 in timed relation to the other parts of the apparatus. The cam surfaces of plate 121 may be designed as shown to move the pairs of grippers 112 to open or non-gripping position against the tension of suitable springs 122 connected between the grippers of each pair. When so permitted by cams 121, the springs urge the rubber-faced grippers 112 into gripping or clamping engagement with the side edges of the cracker column. If desired, the functions of the cam and springs may be reversed so that the grippers are moved to closed or clamping position by positive camming action against spring tension.

In one operative embodiment, the column or single row of crackers on edge is advanced by the conveyor belt 108 a distance of 13⅛" per cycle. The grippers 112 are carried at a slower but uniform rate of speed advancing the crackers 7½" per cycle. Thus, under the restraining or retarding influence of the grippers 112 on the column of crackers, the belt 108 slips relatively to the crackers approximately ¾" for each inch of travel of the crackers.

Still referring to FIGS. 5 and 6, when the cracker column has advanced a distance of 7½" under the retarding influence of a leading pair of grippers 112 in clamping position, said grippers are released and the following or trailing pair of grippers become effective to clamp the sides of the column and thus free or meter off a group 123 of crackers between two successive pairs of grippers 112. However, a fraction of a second prior to the instant that the trailing pair of grippers 112 close upon the sides of the column, the leading pair of grippers release their hold at the head of the column.

Just prior to the release of the leading pair of grippers 112, a flight finger 124 travelling at the same speed as belt 108 is inserted in front of the leading cracker to prevent the crackers from falling forward when released by grippers 112. Upon release the entire column of crackers moves at the higher speed of belt 108 so that by the time the trailing pair of grippers 112 become effective to again grip the column of crackers, the length of the group of crackers 123 being metered has been increased from 7½" to approximately 8¼". When the grippers 112 close and again retard the movement of the column of crackers, the metered group 123 continues to travel with belt 108 at the higher speed, thereby creating between the metered group and the leading end of the column of crackers a space into which a second flight finger 125 is inserted. Thus, the metered group of crackers 123 is confined between and carried by a pair of fingers 124, 125, the operating mechanism for which is hereinafter described.

Means may be provided for preventing the trailing crackers of each group from falling rearwardly before flight finger 125 is inserted into operative position. Such means may comprise a steady air blast 126 and/or brushes 127 carried by an endless belt or chain 128 (FIG. 8) which operates in timed relation with gripper conveyor 113, 114 to present a brush 127 at the proper time to engage and move at the same speed as the trailing cracker of a group 123 when the latter is advanced and segregated from the column of crackers.

During the following cycle the column of crackers retarded by a pair of grippers 112 travels 7½" only while the metered group 123 travels 13⅛". Assuming the distances to be exact and constant, since the group 123 measures 8¼", a space of 4⅞" is created between the group 123 and the group next to be metered. It is to be understood that the cycle for metering and segregating the groups or so-called slugs of crackers 123 is repetitive and each projection and retraction of a gripper 112 or a flight finger 124 or 125 is periodically effected so that the cycle is continuously occurring at a rapid rate of speed.

The flight fingers 124 and 125 may be mounted and actuated by means illustrated in FIGS. 6 and 10 to 13. Since these flight fingers are mounted in essentially the same manner with the pairs facing in opposite directions, only the mounting for fingers 125 will be described in detail.

Figure 11:
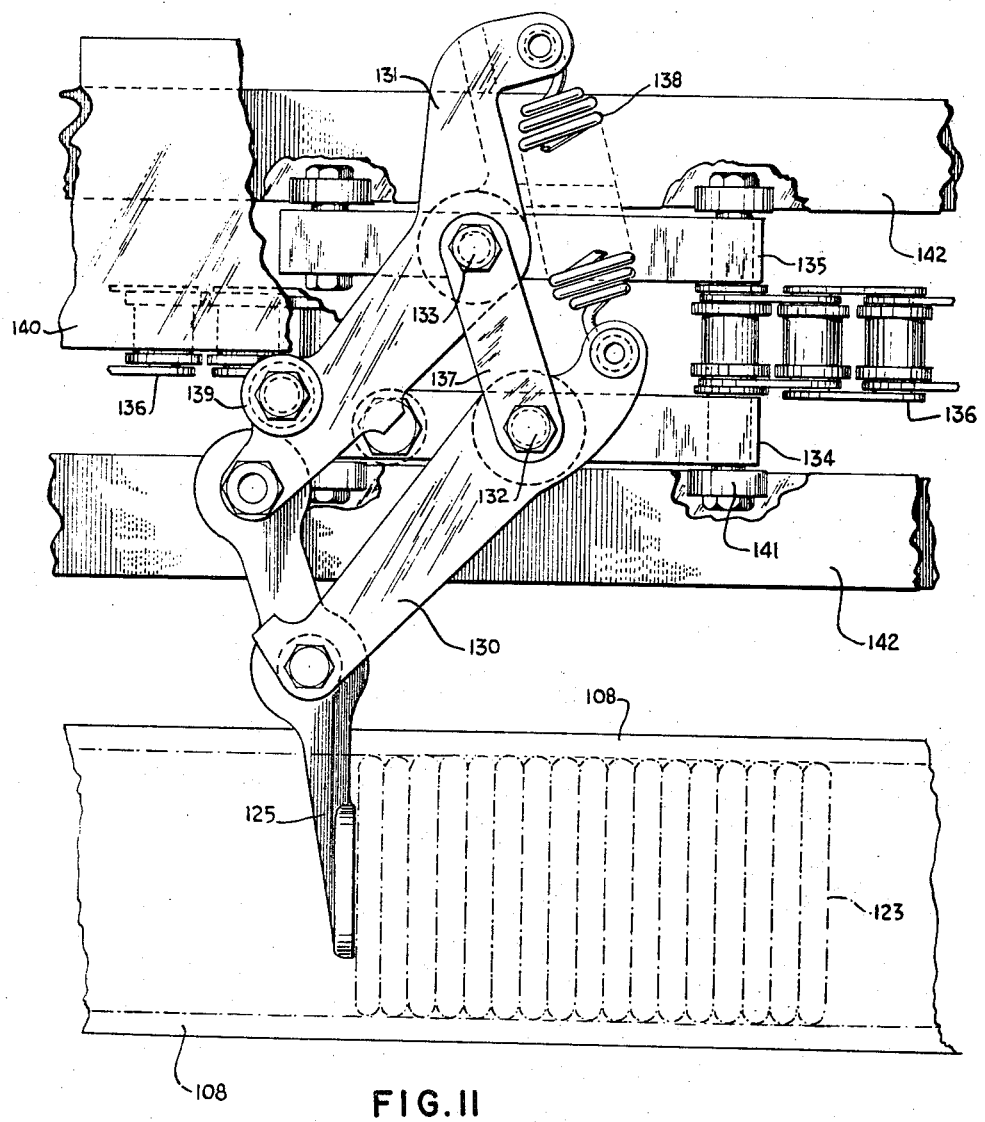
FIG. 11 is a detail plan view with parts broken away, illustrating a finger type conveyor mechanism in conveying position.
Figure 12:
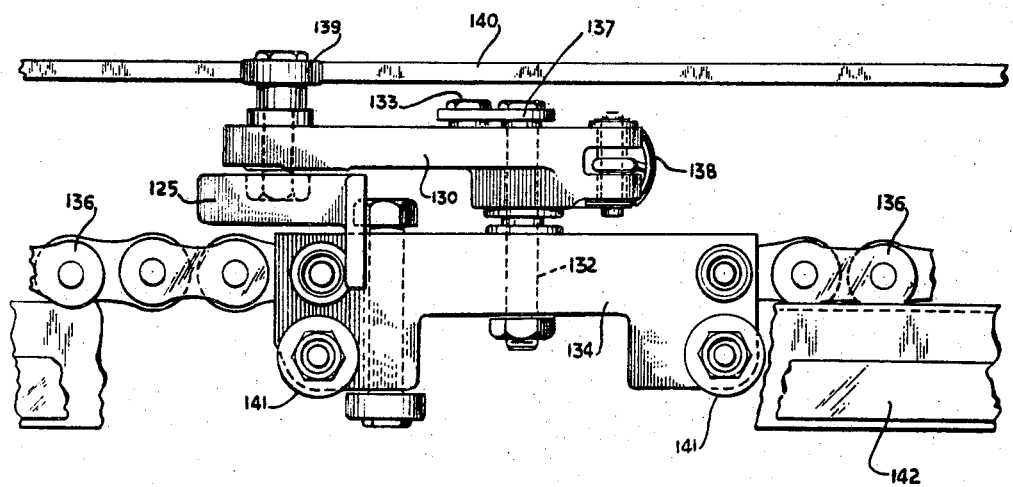
FIG. 12 is a side elevation of the conveyor mechanism of FIG. 11.
Figure 13:
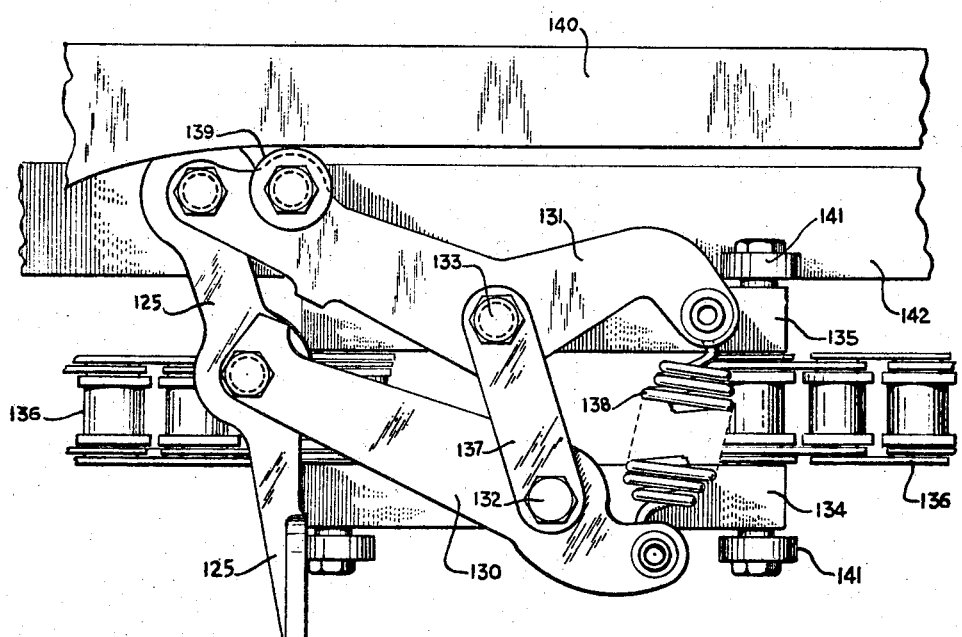
FIG. 13 is a view similar to FIG. 11, but with the conveying finger retracted.

Each flight finger 125 is pivotally secured to adjacent ends of parallel links 130, 131 which are pivotally mounted at 132 and 133 on bars 134, 135, respectively, connected to the sides of an endless conveyor chain 136. The upper ends of pivot pins 132 and 133 may be connected by a bar 137 to increase the rigidity of the parallel linkage mechanism. The other ends of links 130 and 131 are connected by a coil spring 138 and are so constructed beyond pivots 132 and 133 that the spring is extended under tension when the finger 125 is moved from retracted position (FIG. 13) to operative or conveying position (FIG. 11).

To effect movement of finger 125 into conveying position in engagement with the trailing end of a group of crackers 123, a cam follower roller 139 is mounted on link 131 to engage a stationary cam plate 140, the contour of which is designed to actuate finger 125 toward operative position and to engage the trailing end of a group 123 of crackers and at the same time extend and tension spring 138. When the surface of the cam permits, the spring 138 is effective to retract finger 125 to the position illustrated in FIG. 13. If desired, rollers 139 may follow a cam groove or double track whereby the finger will be both inserted and retracted by positive cam action. As shown, the bars 134, 135 carry guide rollers 141 which ride in grooved tracks 142 (FIG. 10) at opposite sides of chain 136 to steady the parallel motion linkages of which fingers 125 are a part when they are in functioning position. Conveyor chain 136 is driven in a known manner by suitable sprockets, one of which is illustrated at 143 in FIG. 10.

The packageable groups or units of crackers 123 thus metered and segregated so they are continuously advanced may be carried forward by pairs of flight fingers 124, 125 to packaging apparatus wherein the same may be automatically enclosed in sealed inidvidual packages in the manner disclosed and described in the aforesaid copending parent application.

Although only a limited number of embodiments of or variations in the article handling apparatus comprehended by the invention have been illustrated in the drawings and described in the foregoing specification, it is to be expressly understood that the invention is not thus limited. Various changes and modifications which do not depart from the spirit and scope of the invention will now be apparent to those skilled in the art.

What is claimed is:

1. Apparatus for transforming a group of equivalent individual lines of panels, such as crackers, moving at a given speed along respective paths into a single common line moving at a sufficiently greater speed to accommodate the panel movement in all individual lines, comprising a plurality of conveyor means, each juxtaposed to a respective one of said paths, driven at a speed greater than panel line advance therein, and normally having no effect on the panels in its respective path; mechanism for each panel line path whereby the conveyor means juxtaposed thereto intermittently is disposed to intercept a foremost length of panels therein and move the same at said greater speed; means for sequentially actuating the mechanism for said paths, whereby lengths of panels are sequentially picked off from said paths, accelerated to said greater speed and delivered from said paths in staggered relation; and means for receiving said staggered lengths of panels and directing the same into a single line.

2. The apparatus described in claim 1 wherein the independent panels are in shingled formation in their respective lines, and additionally including means for tilting the shingled panels in each line forwardly in the direction of advance thereof before the same are intercepted by said conveyor means.

3. The apparatus described in claim 2 wherein said means for tilting the panels forwardly comprises flexible means travelling at a speed greater than panel line advance for applying a force to the upper edge portions of the panels in the direction of advance thereof.

4. The apparatus described in claim 3, wherein said flexible means comprises disc-like brushes engageable with the top edges of the panels, the peripheral surfaces of said brushes having a linear speed in excess of the speed of panel line advance.

5. Apparatus for transforming a group of equivalent moving rows of panels, such as crackers, into a single moving line, comprising two conveyor means for each panel row, one arranged to receive its respective panel row and advance the same along a predetermined path at a normal speed, the other juxtaposed to said path, driven at a speed greater than the normal travel of panels therein, and normally having no effect on the panels in said path, means for each panel path whereby said other conveyor means intermittently is disposed into said path to intercept a foremost length of panels therein and move the same at said greater speed, means for sequentially actuating the means for disposing the other conveyor means into the paths of said panel rows, whereby lengths of panels are sequentially picked off from said rows, accelerated and delivered forth in staggered relation to each other, and means for integrating the staggered lengths of panels into a single line.

6. Apparatus for consolidating equivalent rows of advancing panels, such as crackers, into a lesser number of panel highways, each highway comprising means whereby the panel rows therein are advanced along respective predetermined paths, conveyor means for each path, said conveyor means being driven at a speed faster than panel row advance in its respective path and normally having no effect on the panels therein, mechanism for each path whereby the respective conveyor means therefor intermittently is effective to intercept a foremost length of panels from the row thereof in its respective path and move the same at said faster speed; further means for each highway for sequentially actuating the mechanism of the paths therein so that lengths of panels are sequentially picked off in the respective highway paths, accelerated to said faster speed and delivered from said respective highway paths as staggered lengths of panels; and still further means for each highway for receiving the staggered lengths of panels and directing the same into a single consolidated line and towards a destination.

7. In apparatus for assembling a plurality of independent columns of tablet-like articles, such as crackers or the like, into single line formation, means for continuously advancing said article columns in control lanes each having parallel means separated by a space for supporting an article column thereon, a plurality of conveyors running at a speed faster than the advance of said columns, one below each lane and the column therein, and normally having no effect on the same, means for intermittently independently elevating each conveyor to a position effective to pick off a predetermined length from the leading portion of the article column thereabove and convey the predetermined length of articles at said accelerated rate, means for actuating said conveyor elevating means to effect sequential transfer of the predetermined lengths of articles from said lanes to said conveyors, the latter means including timing means whereby each length of articles is picked off and accelerated only after the end of the immediately preceding length of articles is positioned to clear a predetermined line prior to the front of said next accelerated length of articles clearing said line, and means for sequentially receiving said predetermined lengths of articles and diverting the same into a single line.

8. Apparatus for automatically rearranging tablet-like articles, such as crackers and the like, from a plurality of preliminary rows into a single final row, comprising: paired conveyor means for each preliminary row, one arranged to receive the articles of its respective preliminary row and advance the same along a predetermined path at a normal speed, the other juxtaposed to said path, driven at a speed greater than the normal travel of articles therein, and normally having no effect on the articles in said path; means for each article path whereby said other conveyor means is positionable into the plane of article travel in said path to intercept a foremost section of articles therein and move the same at said greater speed toward the final row; means for intermittently actuating the means for positioning the other conveyor means into the path of said preliminary rows in succession, whereby sections of articles are picked off from said preliminary rows in succession, accelerated to said greater speed toward the final row as a succession of separated groups of articles, and means for combining the said succession of groups into the said final row.

9. Apparatus as described in claim 8, wherein at each preliminary row (a) the other conveyor means normally is positioned below said one conveyor means, (b) the means for positioning said other conveyor means includes a vertically reciprocable track, and (c) the actuating means includes means for achieving rapid positioning of said track.

10. Apparatus as described in claim 9 wherein said last-named comprises normally compressed resilient means.

11. Apparatus as described in claim 10 comprising means for intermittently releasing said resilient means for actuating said track and for restoring said resilient means to compressed condition after each actuation.

12. The apparatus described in claim 8 wherein said one conveyor means at each article path includes paired parallel running and spaced endless belts, and said other conveyor means includes an endless conveyor below the space between said belts, elevatable between said parallel belts, and having means thereon for lifting a foremost article section from said paired belts to move said article section at said greater speed.

13. Apparatus for handling and conveying tablet-like articles, such as crackers, and reassembling the same from a plurality of article columns to a lesser given number of consolidated rows, comprising: a given number of highways, each highway including means whereby a number of article columns are advanced along a corresponding number of predetermined paths; conveyor means for each path in each highway, said conveyor means being driven at a speed faster than article column advance in its respective path and normally having no effect on the articles therein; mechanism for each path whereby the respective conveyor means therefor intermittently is made effective to intercept a foremost length of articles in its respective path and move the same at said faster speed; further means for each highway for sequentially actuating the mechanisms of the paths therein so that lengths of articles are sequentially picked off in the respective highways as staggered lengths of articles, said further means including timing means whereby each length of articles is picked off and accelerated only after the end of the immediately preceding length of articles in its respective highway is positioned to clear a predetermined line prior to the front of said next accelerated length of articles clearing said line; and still further means for each highway for receiving the staggered lengths of articles and diverting the same into single line relationship.

14. In apparatus wherein means are provided for continuously advancing a given number of continuous progressions of cracker panel rows along parallel paths, the improvement which resides in combining said latter means with means whereby foremost lengths of cracker panels in the progression thereof sequentially are picked off, accelerated and separated from their respective cracker panel progressions, the latter means including timing means whereby each length of cracker panels is picked off and accelerated only after the end of the immediately preceding length of cracker panels is positioned to clear a predetermined line prior to the front of said next accelerated length of cracker panels clearing said line, and means whereby the separated lengths of cracker panels are guided into a consolidated row.

15. Apparatus for processing bakery goods which comprise a continuous supply of articles of the class including crackers, comprising means defining a number of single-line approach lanes succeeded by a single-line common lane, means for continuously advancing lines of the articles respectively along the approach lanes toward the common lane, and merging apparatus for merging the lines in the approach lanes into a single line moving at a higher rate of speed in the common lane than in any approach lane, the merging apparatus comprising means, acting for the approach lanes in succession only, to accelerate and move a group of the leading articles of any such lane forwardly away from the following articles in the same lane and into a common lane to form a segment of a single common line of articles therein, the merging means further including means for causing the articles moved into the common lane to comprise a single unbroken line moving at a rate of speed in excess of the speed of line movement in any approach lane.

16. In an apparatus according to claim 15, wherein all said lanes are generally horizontally disposed, and wherein the said articles therein comprise panel-like articles at least loosely stacked on edge with intermediate articles of any said lane thereof being supported in its said on-edge stacked condition by an adjacent article, auxiliary support means included in said merging apparatus for insuring that the articles of each said group of articles moved from any said approach lane into the said common lane to join the trailing end of the said single line of articles therein joins such single line with the articles at the point of juncture being in the said on-edge stacked condition.

17. Apparatus for metering and retarding a progression of crackers resting on edge, said apparatus comprising a continuous conveyor for advancing said progression of crackers, a pair of metering conveyors, each positioned on a respective side of said advancing conveyor, means on each of said metering conveyors for engaging a respective side of an advancing cracker, means for operating said metering conveyors at a speed less than the speed of the advancing conveyor, and means for aligning the top edges of said crackers prior to said advance thereof between said metering conveyors.

18. An apparatus as recited in claim 17, wherein said aligning means comprises a tamping plate situated above said advancing conveyor, means mounting said tamping plate for cyclic movement toward and away from said advancing conveyor, and means for imparting said movement to said plate.

19. In apparatus for packaging articles, constant speed conveyor means for continuously advancing a column of articles to be packaged, and retarder means for periodically momentarily slowing down a trailing portion of said column while a leading portion of said column continues to travel at said constant speed to form spaced packageable units of said articles in the column.

20. Apparatus as defined in claim 19 comprising gripper conveyor means for gripping each of said units to support and continuously advance the same beyond said first-named conveyor means.

21. In apparatus for handling articles, such as biscuit to be packaged, conveyor means for simultaneously advancing a plurality of columns of said articles, means for converging articles from all of said columns into a single column, means for automatically metering the articles in said single column into packageable groups, means for continuously advancing said single column, and means for successively separating each of said groups a predetermined amount from the following group in said advancing column.

22. An apparatus for metering and retarding a progression of crackers resting on edge, said apparatus comprising a continuous conveyor for advancing said progression of crackers, a pair of metering conveyors each positioned on a respective side of said advancing conveyor, means on each of said metering conveyors for engaging a respective side of an advancing cracker, and means for operating said metering conveyors at a speed less than the speed of the advancing conveyor.

23. An apparatus as recited in claim 22 wherein said cracker-engaging means comprises a pair of soft padded portions arranged to engage said cracker side edge therebetween.

References Cited

UNITED STATES PATENTS 3,194,382    7/1965    Nigrelli _____ 198—34

EDWARD A. SROKA, *Primary Examiner.*